United States Patent [19]

Wright et al.

[11] 3,754,468
[45] Aug. 28, 1973

[54] APPARATUS FOR DEEP-FAT COOKING
[75] Inventors: Edward S. Wright, Pittsburgh, Pa.;
John W. Angstadt, Williamsville;
Gerard L. Garrow, Buffalo, both of N.Y.
[73] Assignee: Blaw-Knox Company, Pittsburgh, Pa.
[22] Filed: Jan. 21, 1971
[21] Appl. No.: 108,303

[52] U.S. Cl. .................................................. 99/403
[51] Int. Cl. ........................................... A47j 37/12
[58] Field of Search ..................... 99/403, 404, 405,
99/406, 407, 408, 409, 330, 336, 345, 356,
359; 126/344, 376

[56] References Cited
UNITED STATES PATENTS
1,707,786   4/1929   Ehrhart ................................. 99/406
3,026,885   3/1962   Eytinge ............................ 99/405 X
3,209,678  10/1965   Benson et al. ....................... 99/406
3,309,981   3/1967   Benson et al. ................... 99/407 X
3,641,924   2/1972   Sijbring ............................... 99/406

Primary Examiner—John Petrakes
Assistant Examiner—Arthur O. Henderson
Attorney—Marn & Jangarathis

[57] ABSTRACT

A new process and apparatus for the continuous deep-fat cooking of a food to produce a processed comestible wherein the food is passed through an elongated cooking zone. Hot cooking oil is introduced and withdrawn from the cooking zone at a plurality of points to produce hydraulic effects which insure proper contact of the food with the cooking oil.

12 Claims, 3 Drawing Figures

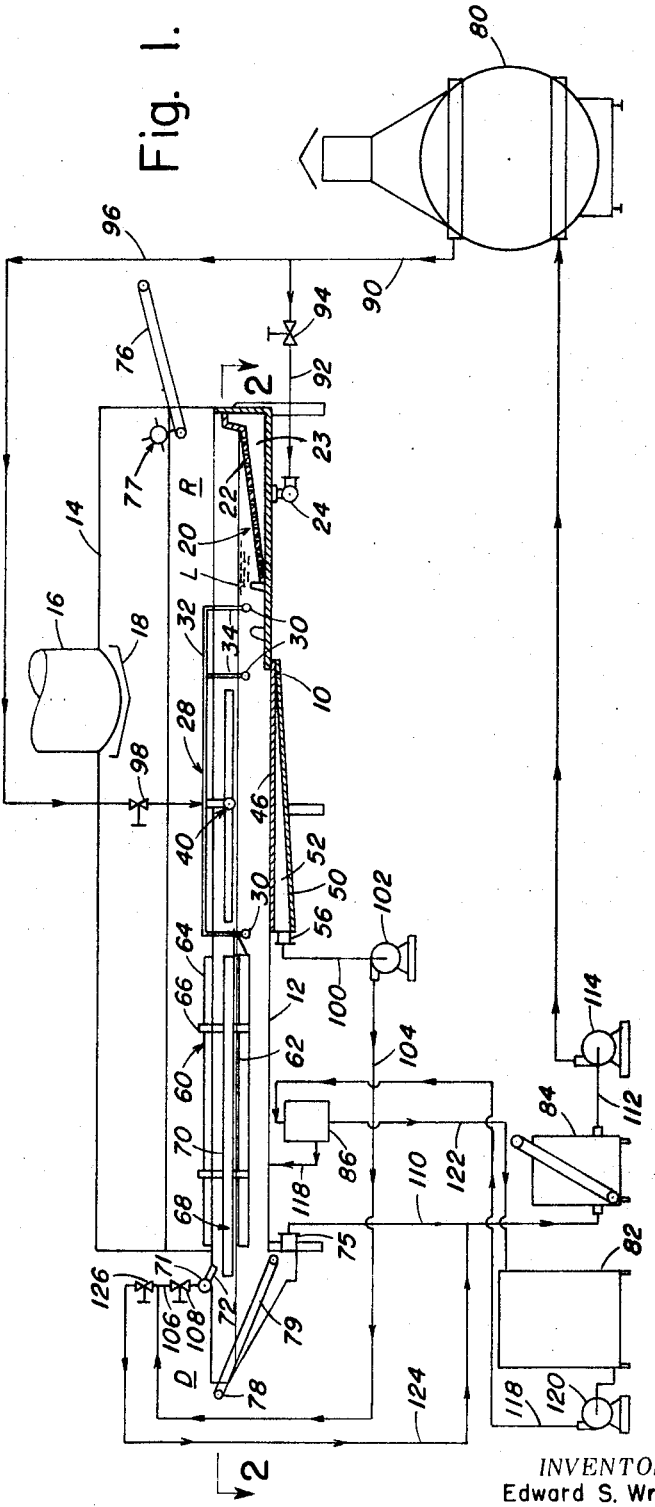
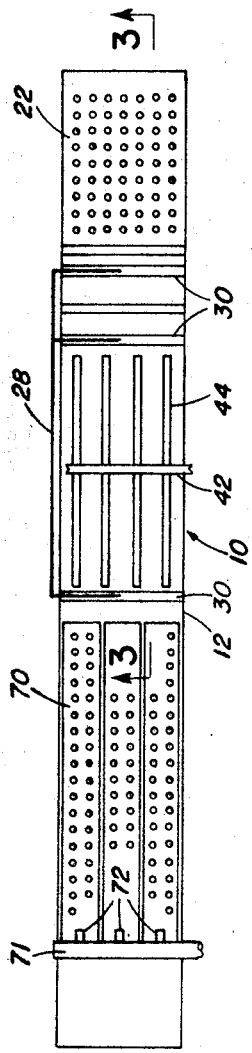
Fig. 1.
Fig. 2.
INVENTORS
Edward S. Wright
John W. Angstadt
Gerard L. Garrow
BY Marn & Jangarathis
ATTORNEYS

APPARATUS FOR DEEP-FAT COOKING

This invention relates to a new apparatus for the cooking of foods, and more particularly to a new process and apparatus for the deep-fat cooking of foods to produce processed comestibles, such as potato chip and like products.

BACKGROUND OF THE INVENTION

Early processes for continuously deep frying potato slices and the like to produce potato chips utilized elongated cooking troughs or kettles containing a cooking oil which was heated by the direct contact of hot gases with the underside of the kettle bottom. Potato slices and other like materials to be processed were floated along the surface of the cooking oil and pushed throughout the length of the kettle by spaced-apart pusher assemblies.

More recent processes employed elongated troughs or kettles wherein the cooking oil was separately heated, either directly or indirectly e.g., a boiler or heat exchanger and passed to the cooking apparatus. A major portion of the oil was introduced into the kettle at the slice-receiving end of the kettle, withdrawn from the other end, reheated and re-introduced into the kettle. With due consideration to heat transfer requirements, i.e., sensible heat required to raise the potato slice to cooking temperatures, latent heat required to vaporize the water content of the slices, maximum temperature to which the cooking oil may be heated without excessive break down thereof to free fatty acids, etc., in view of the cooking time required for an average size potato slice, it was necessary to provide mechanical restraining devices, such as rotating flow wheels, rakes or submerger belts, intermediate the ends of the kettle to provide the necessary residence time for dewatering the potato slices (about 80 percent by weight of the slice) and for cooking the potato slices. This resulted in an oil flow rate through the kettle of about 5 to 6 times the rate of flow of the potato slices where a residence time of from about 3 to 4 minutes is required to produce an acceptable product. Final cooking of the slice is generally thought to be the reduction of the water content from about 10% to about 2% which is the moisture content of an acceptable product.

In many of the prior art apparatus, the potato slice had a tendency to adhere to the surface of the kettle as well as to the mechanical restraining devices in the early stage of cooking when the potato slice is in a pliable plastic state causing a dam effect thereby resulting in the development of areas of high cooking oil velocities in the clearance between the restraining mechanisms and the bottom and sides of the kettle. Some slices would surge through the areas of such high velocity and would not be retained in the kettle for a time sufficient to be properly cooked. Such high velocities of cooking oils created by the damming effect also had a tendency to develop eddies or whirlpools which would excessively restrain some of the slices being processed to the extent that the resulting chip was overcooked, and in some instances burnt thereby requiring manual removal prior to packaging. Breakage of an overcooked or burnt chip would result in fines in the cooking oil and fines in the cooking oil tend to break down the oil and form free fatty acids which are detrimental to the flavor and shelf life of the product. Additionally, high heat levels required at the inlet end necessitate high oil flow rates to provide for proper heat levels for final cooking of the slice.

SUMMARY OF THE INVENTION

It is an object of the invention to provide a new apparatus for the deep-fat cooking of foods to produce processed comestibles, such as potato chips and like products.

Another object of the invention is to provide a new apparatus for the deep-fat cooking of foods which will reduce cooking times and form a more uniform product.

Still another object of the invention is to provide a new apparatus for the deep-fat cooking of foods whereby improved thermal efficiencies are achieved.

A further object of the invention is to provide a new apparatus for the deep-fat cooking of foods which will reduce cooking oil requirements per unit weight of product than heretofore achieved.

A still further object of the invention is to provide a new apparatus for the deep-fat cooking of foods which will substantially reduce the quantity of fines produced.

These and other objects of the invention are achieved in an elongated trough or kettle wherein a major portion of the cooking oil is introduced into the kettle at the food-receiving end over a large area in essentially countercurrent contact to the food slices being introduced into the kettle. The food slices initially fall towards the bottom of the kettle but are caused to move gently upward by the hydraulic force of the rising cooking oil which helps to separate the wet slices as the violent boiling action is initiated by the formation of water vapor. The slices pass into a second zone of the kettle including an agitating means and a means for introducing a second portion of heated cooking oil from a plurality of points above the surface of the cooking oil which effects another hydraulic force to cause the slices to tumble to insure that all surfaces are properly exposed to the cooking oil. In this second zone, a portion of the cooking oil is withdrawn and passed to a subsequent zone. The slices move to a third zone wherein the final cooking thereof is effected at controlled cooking oil temperatures most effective for completion of the cooking process. In the third zone, the slices are subjected to a further hydraulic effect by the introduction of cooking oils withdrawn from the second zone. By the continuous introduction into the kettle of cooking oils at controlled temperatures and flow rates in accordance with the present invention, the cooking time of the slice may be reduced by as much as 33 percent with an increase in capacity for a given kettle size by as much as 58% per square foot of surface area compared with prior art processes. The concentration of slices in the cooling oil results in what may be called a slurry which is dense enough for essentially plug flow thereby producing a more uniform product.

Since the oil turnover rate, i.e., oil absorbed into the slices, is increased by the greater production rate in a like size kettle which reduces the length of time oil remains in the system, the tendency of the oil to break down and form free fatty acids is reduced which permits the preparation of a product having a longer shelf life. Additionally, the hydraulic effects produced in accordance with the invention achieve improved heat transfer relationships between the slices and cooking oils since temperature gradients at any given cross-sectional point in the kettle are minimized as compared to prior art apparatus wherein temperature stratification due to the damming effect was commonplace. For ease of understanding, the invention will be described with reference to the treatment of potato slices to produce potato chips, it being understood that other foods suitable for deep-fat cooking may be also used. It will be appreciated from the following description of the invention that the temperature of the hot oil at various points in the kettle may be controlled to any necessary degree by the valving arrangement to permit mixing of oil streams at different temperature levels to achieve temperature levels proper for the treatment being effected, i.e., initial evaporation of a portion of the water content of the slice, and cooking. It is understood that not all of the water content is eliminated from the processed comestible.

BRIEF DESCRIPTION OF THE DRAWINGS

Further objects and advantages of the invention will become apparent upon consideration of the detailed disclosure thereof, especially when taken with the accompanying drawings wherein like numerals designate like parts through:

FIG. 1 is a schematic side sectional view of the apparatus of the invention and a schematic flow diagram of the process for the deep-fat cooking of foods;

FIG. 2 is a sectional top view of the apparatus partially schematic taken along the lines 2—2 of FIG. 1.

Figure 3:
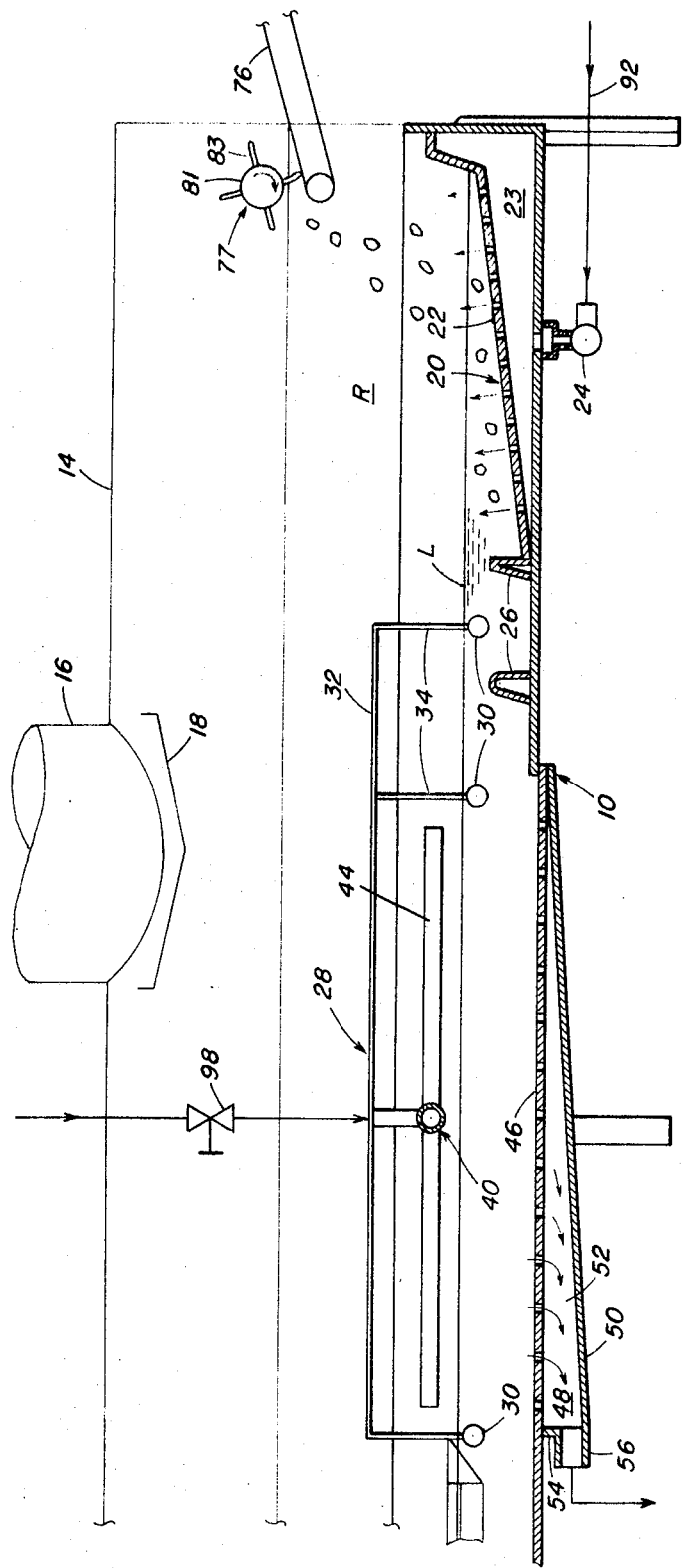
FIG. 3 is an enlarged cross-sectional view of the receiving end of the apparatus taken along the lines 3—3 of FIG. 1.

Referring now to the drawing there is illustrated a cooking apparatus, generally indicated as 10, comprised of an elongated trough or kettle 12 suitably sheathed with heat insulating material (not shown) having a receivine end and a delivery end, generally indicated as R and D, respectively. The surface level of the cooking oil and product being processed in the kettle 12 is indicated as L. The top of the kettle 12 is partially enclosed with a hook 14 having a vent 16. A deflector plate 18 for condensate removal is suitably mounted (not shown) with the hood 14 below the vent 16. Within the receiving end R of the kettle 12, there is positioned an oil distribution means, generally indicated as 20, comprised of a plate 22 having a plurality of orifices and forming an oil distribution zone 23 with the bottom and side walls of the kettle 12. The angle of the plate 22 may be varied by an adjusting means (not shown) depending on desired cooking conditions, as more fully hereinafter discussed. Below the plate 22, the bottom of the kettle 12 is provided with a oil inlet manifold 24 (See FIG. 3). Downstream of the distribution plate 22, weirs 26 are provided extending crosswise to the length of the kettle 12.

A chip agitator means, generally indicated as 28, is provided intermediate the ends R and D suitably mounted to a drive assembly (not shown) to effect a vertical reciprocating motion. The chip agitator is comprised of plurality of horizontally extending bars 30 mounted to an upper support member 32 by a plurality of hangers 34. Below the upper support member 32 and above the surface of the cooking oil L, there is provided an oil distribution means, generally indicated as 40, comprised of an inlet manifold 42 extending across the kettle 12 with a plurality of longitudinally extending conduits 44 having orifices therein (not shown) suitably mounted thereto. Below the oil distribution means 40, the bottom of the kettle is formed with a perforated plate 46 forming an oil collection zone 48 with a bottom plate 50, triangularly shaped side walls 52 and a front wall 54 (See FIG. 3). The front wall 54 is provided with an outlet manifold 56.

Between the chip agitator means 28 and the delivery end D of the kettle 12, there is provided a rake means, generally indicated as 60, of a design known to those skilled in the art, such as that illustrated in U. S. Pat. No. 2,085,494 to Joseph D. Ferry, entitled "Impeller Mechanism for Cooking Apparatus." The rake means 60 is comprised of a plate 62 having a plurality of orifices (not shown) formed therein and a plurality of downwardly extending fingers or prongs (not shown) affixed to the bottom. The plate 62 is mounted to a support assembly 64 by support bars 66 and is caused to move in an oval or elliptical path by a drive means (not shown) with movement being essentially clockwise to the axis of the rake means 60 when viewing FIG. 1. Positioned above the perforated plate 62 there is provided a fluid distribution means, generally indicated as 68 comprised of a troughed plate 70 having a plurality of perforations, and a manifold 71 having conduits 72 extending downwardly therefrom to a point above the troughed plate 70. Below the chip delivery end D and at the bottom of the kettle 12, there is provided an outlet manifold 75.

Above the receiving end R of the kettle 12, a feed conveyor 76 is positioned for introducing the slices into receiving end R. Positioned above the conveyor 76 is a slice separator, generally indicated as 77 comprised of a cylinder 81 having a plurality of flexible extensions or fingers 83. The slice separator is caused to rotate clockwise by a motor means (not shown) at a rotational velocity greater than the linear velocity of the belt of conveyor 76 to separate the slices to reduce the number of chips withdrawn from the kettle having soft centers. The delivery end D is provided with a discharge conveyor 78 having a plurality of outwardly extending fingers or prongs 79 which assist in removing the chips from the kettle 12. The assemblies for forming potato slices from whole potatoes (i.e., washer, peeler, slicer, etc.) and for packaging the potato chips do not constitute a part of this invention and are of the type presently known and used by those skilled in the art.

Referring now to FIG. 1 wherein there is illustrated a schematic flow diagram of the invention, the major components thereof include in addition to the cooking apparatus 10, a heater 80, an oil storage tank 82, a strainer tank 84, and a liquid leveling device 86. The heater 80 is in fluid communication by line 90 and line 92 under the control of valve 94 with inlet manifold 24, and by line 90 and line 96 under the control of valve vwith the oil distribution means 40. The outlet manifold 56 of the kettle 12 is in fluid communication through line 100 by pump 102 and line 104 with inlet manifold 71 by line 106 under the control of valve 108. The outlet manifold 75 is in fluid communication by line 110 with strainer tank 84 wherein fines are removed from the circulating oil. The strainer 84 is connected by line 112 and pump 114 to heater 80 through line 116.

The liquid leveling device 86 is in fluid communication with kettle 12 by line 118. The storage tank 82 provides a source of oil to leveling device 86 through line 118 by pump 120 and acts as a surge tank for level device 86 by line 122. Lines 104 and 110 are in fluid communication therebetween by line 124 under the control of valve 126 for adjusting heat requirements, as more fully hereinafter discussed.

In operation, hot cooking oil at a temperature of from about 335° to 370°F. is introduced into the kettle 12 through the manifold 24 into the zone beneath the plate 22 from heater 80 by lines 90 and 92. The heater 84 is illustrated as being of the direct fired type; however, it is understood that a heat exchanger may be employed wherein the cooking oil is heated by indirect contact with an intermediate heat transfer fluid.

Potato slices are passed to the kettle 12 by conveyor 76 from which the slices drop into the receiving end R of the kettle 12 and contact countercurrently the hot cooking oil passing upwardly through the orifices of plate 22. As mentioned above, the angle of the plate 22 may be varied dependent upon the material being treated, residence time, cooking temperatures, and the like. After the initial impact of the slices into the cooking oil, the slices are agitated by the upward hydraulic effect of the cooking oil being introduced over a wide area which effect help to separate the wet potato slices as the violent boiling action caused by water vapor being released from the slices. As is known to those skilled in the art, the greatest heat requirements are during the initial contact of the potato slices with the cooking oil when 25 percent of the moisture of the potato slice is removed and is easily achieved by the present invention. This initial treatment will be hereinafter some time referred to as "phase I cooking".

The potato slices will form a bed, generally of from 3 to 4 inches or more which moves continuously towards the discharge end D of the kettle 12. The slices and hot cooking oil pass over the weirs 26 which together with the effect of the vertical reciprocating movement of the bars 30 of the agitator 28 further cause the slices to tumble to assure exposure of all surfaces of the slices to the cooking oils. As the bed of slices moves into the intermediate portion of the kettle 12, the bed is contacted with an additional quantity of cooking oil in the form of a plurality of streams thereof from the liquid distribution means 40. The streams of cooking oils provides another hydraulic effect to tumble further the slices to expose all surfaces of the slices to the cooking oil. As mentioned hereinabove, such hydraulic effects minimize adherence of the slices to the surface of the kettle and to each other when the slices are in a pliable plastic state.

A portion of the cooking oil introduced into the kettle from the heater by line 90 is withdrawn from kettle 12 through perforated plate 46 via outlet manifold 56 and is passed through line 100 by pump 102 for subsequent use as more fully hereinafter described. During passage of the bed of slices through the intermediate section of the kettle 12 further dewatering of the slice is effected and such passage will hereinafter some time be refereed to as "phase II cooking".

The bed of slices thereupon pass into the last section or zone of the kettle 12 wherein completion of the cooking of the slices is effected, hereinafter some time referred to as "phase III cooking." The rotational movement of the rake means 60 is such to effect an essentially elliptical movement of the rake plate 62 whereby the fingers or prongs thereof dip into the bed of slices, move to the left (FIG. 1) and then elevated from the surface of the material and returned to the starting point (essentially a clockwise movement). During this essentially leftward movement, the fingers or prongs engage and move the slices, thus assisting the oil flow in traversing the slices through phase III cooking. Additional cooking oil in line 106 is supplied by manifold 71 through conduits 72 onto the trough plate 70 from which the oil passes through the orifices onto the rake plate 62 and thence to said oil-slice bed through the orifices therein. It will be noted that a portion or all of the cooking oil introduced onto the plate 70 is the cooking oil removed from the kettle 12 in line 100. The now-cooked slices or chips pass to the delivery conveyor 76 whereat the prongs or fingers 79 affixed to the conveyor belt of the conveyor 78 assist in withdrawing the chips from the cooking oil. Cooking oil in discharge end D is withdrawn from manifold means 75 and passed by line 110 to strainer 84 wherein fines are removed. The cooking oil is withdrawn from strainer 84 in line 112 by pump 114 and is passed through line 116 to heater 80 wherein the cooking oil is raised to the required temperature level for re-introduction into the kettle 12.

The oil leveling device 86 is connected to a remote sensing device (not shown) which measures the level of cooking oil and slices in the kettle 12. The leveling device 86 is in fluid communication with storage tank 82 (continuously or discontinuously) by pump 120, i.e., pump continuously running or activated in response to a signal from the remote sensing device. Should the remote sensing device be activated in response to a level below the preselected level L, cooking oil is introduced into the kettle 12 by line 118 from storage tank 82 under the control of the leveling device 86 until the preselected level L is reached, at which point the fluid flow through the line 118 is discontinued.

It will be appreciated from the conduit and valving arrangement that the temperature of the oil may be controlled to any necessary degree to provide control of the oil temperature within the kettle 12 at the most effective temperature level for accomplishing the desired purpose in the various cooking phases. For instance, there are greater heat requirements in phase I cooking wherein the temperature of the slices is first raised to 212°F. at which point the water contained in the slices begins to vaporize and wherein vaporization of water in the slices is effected to the extent that approximately 25 percent thereof is removed. A high temperature level of the cooking oil is desirable for phase II cooking wherein the slices are further dewatered whereas lower temperature levels of the cooking oil for phase III cooking is generally preferred particularly from the standpoint of the color of the final product. For instance, with potato slices having a high sugar content, it is desirable to have a low temperature level in phase III cooking to prevent overcooking (excessive carmelization of the sugar) whereby a dark brown product results. Thus, the temperature level in phase III cooking is varied by proportioning the flow of cooking oil withdrawn in line 100 between lines 106 and 124. For higer temperature levels, the ratio between the flow of cooking oil in line 108 to line 124 is increased whereas for lower temperature levels the ratio is decreased. It is understood that all of the cooking oil withdrawn in line 100 from kettle 12 may be passed to the phase III cooking stage.

The term "countercurrent contact" is used to described the relationship between the direction of flow of the chips into the kettle 12 and the direction of flow of cooking oil being introduced into the zone in which chips and oil contact therebetween; i.e., greater than 90°.

Operation of the process and apparatus is described in the following specific example which is intended to be merely illustrative and the invention is not to be regarded as limited thereto.

EXAMPLE I

Potato slices having a 20.0% solids content were introduced at a feed rate of 2540 pounds per hour into a kettle 29 feet long and 1 foot wide. Cooking oil at a temperature of 358°F. was introduced at the rate of 177 GPM and 73 GPM into the kettle through lines 92 and 96, respectively. The desired residence time for the potato slices being treated was determined to be between 150 to 180 seconds. Cooking oil at a temperature of 326°F. was withdrawn at the rate of 200 GPM and passed to manifold 71. Cooking oil at a temperature of 314°F. was withdrawn at the rate of 250 GPM from kettle 12 through outlet manifold 75. The potato chips withdrawn from the kettle 12 by the conveyor 78 had excellent color and taste.

It will be understood that the ability to alter the angle of the baffle plate 22 with the resultant alteration of the hydraulic effect of the cooking oil is one important factor in controlling the flow rate of the chips for proper residence time for cooking the slices which is dependent on various considerations including age of the potato after harvest. The process and apparatus of this invention provides the control of and assurance of proper temperature levels to suit the requirements of the local market under varying conditions of the potato slices being treated. It will be appreciated that by reducing the velocity of the cooking oil through the kettle essentially eliminates the whirlpools and eddy currents of the prior art apparatus and their deleterious effect.

Numerous modifications and variations of the invention are possible within the above teachings and therefore the invention, within the scope of the appended claims, may be practised other than as particularly described.

We claim:

1. In an apparatus for treating a comestible with heated cooking oil including an elongated kettle having comestible feed means for introducing said comestible into one end of said elongated kettle, the improvement which comprises an oil distribution means in said one end disposed beneath said comestible feed means for introducing said oil in countercurrent contact to said comestible over a wide area of said oil distribution means.

2. The apparatus as defined in claim 1 wherein said oil distribution means comprises a plate having a plurality of orifices therein and contiguous with the bottom of said kettle, and wherein an oil inlet zone is formed by said plate and the bottom of said kettle.

3. The apparatus as defined in claim 1 wherein a weir means is disposed transversely across the bottom of said kettle downstream and approximate to said oil distribution means.

4. The apparatus as defined in claim 3 wherein a second oil distribution means is provided intermediate the ends of said elongated kettle.

5. The apparatus as defined in claim 4 wherein said second oil distribution means is disposed above the surface level of the chip-oil slurry and includes a manifold having mounted thereto longitudinally extending conduits including orifices therein.

6. The apparatus as defined in claim 12 wherein a third oil distribution means is provided in the end portion of said kettle opposite the end into which said comestible is introduced.

7. The apparatus as defined in claim 6 wherein said third oil distribution means is disposed above the surface level of the chip-oil slurry and includes a plurality of longitudinally extending trough plates having orifices therein.

8. The apparatus as defined in claim 6 wherein an outlet manifold means is provided in said kettle intermediate the ends of said kettle and is in fluid communication with said third oil distribution means.

9. The apparatus as defined in claim 8 wherein said outlet manifold means is generally disposed beneath said second oil distribution means and includes a perforated plate means.

10. The apparatus as defined in claim 8 wherein a second outlet manifold means is provided in said kettle in the end thereof having said third oil distribution means and is in fluid communication with a heating means for raising the temperature of said oil to that necessary to treat said comestible.

11. The apparatus as defined in claim 10 wherein said heater means is in fluid communication with said first oil distribution means.

12. The apparatus as defined in claim 10 wherein said heater means is in fluid communication with said first and second distribution means.

* * * * *